United States Patent
Köng

(10) Patent No.: US 10,729,095 B2
(45) Date of Patent: Aug. 4, 2020

(54) CHEESEMAKER

(71) Applicant: Kalt Maschinenbau AG, Lütisburg (CH)

(72) Inventor: Martin Köng, Gossau (CH)

(73) Assignee: Kalt Maschinenbau AG, Lütisburg (CH)

( * ) Notice: Subject to any disclaimer, the term of this patent is extended or adjusted under 35 U.S.C. 154(b) by 581 days.

(21) Appl. No.: 15/486,464

(22) Filed: Apr. 13, 2017

(65) Prior Publication Data

US 2017/0303498 A1 Oct. 26, 2017

(30) Foreign Application Priority Data

Apr. 21, 2016 (CH) .................................... 00527/16

(51) Int. Cl.
- *A01J 99/00* (2006.01)
- *A01J 25/10* (2006.01)
- *A01J 25/06* (2006.01)

(52) U.S. Cl.
CPC ............... *A01J 99/00* (2013.01); *A01J 25/06* (2013.01); *A01J 25/10* (2013.01)

(58) Field of Classification Search
CPC . A01J 25/02; A01J 25/008; A01J 11/00; A01J 25/11; A01J 25/13; A01J 25/10; A01J 25/04; A01J 25/06
USPC .......... 366/328, 342, 343; 99/451, 452, 453, 99/455, 456, 458, 459, 460, 462, 495
See application file for complete search history.

(56) References Cited

U.S. PATENT DOCUMENTS

| | | | |
|---|---|---|---|
| 913,889 A | 3/1909 | Hershiser | |
| 2,815,708 A | 12/1957 | Pauly | |
| 2,846,767 A | 8/1958 | Hensgen | |
| 2,942,983 A | 6/1960 | Sadler | |
| 3,192,626 A | 7/1965 | Boeuf | |
| 3,353,269 A | 11/1967 | Lambert | |
| 3,514,857 A | 6/1970 | Rossen | |
| 3,541,687 A * | 11/1970 | Peters | A01J 25/06 99/453 |
| 3,615,587 A | 10/1971 | Koopmans | |
| 3,650,030 A | 3/1972 | Delamere | |

(Continued)

FOREIGN PATENT DOCUMENTS

| | | |
|---|---|---|
| BR | 9300409 A | 9/1993 |
| CH | 353573 A | 4/1961 |

(Continued)

OTHER PUBLICATIONS

European Search Report for EP 17 16 5041 dated Sep. 7, 2017 (1 page).

(Continued)

*Primary Examiner* — Ibrahime A Abraham
*Assistant Examiner* — Dilnessa B Belay
(74) *Attorney, Agent, or Firm* — Fleit Intellectual Property Law; Paul D. Bianco; Stephen Bongini

(57) ABSTRACT

A cheesemaker with a container interior in the form of a cheese vat or cheese kettle, which rotatably incorporates a driven agitator with at least one agitating and cutting blade. The cheesemaker is to be simple in structural design and easy to operate, and also satisfy strict hygiene requirements. This is achieved by providing the agitating and cutting blade with a window that can be detached therefrom, and moved relative to the agitating and cutting blade.

5 Claims, 3 Drawing Sheets

(56) References Cited

U.S. PATENT DOCUMENTS

| | | | |
|---|---|---|---|
| 3,733,804 A | | 5/1973 | Diersbock |
| 3,748,072 A | | 7/1973 | Whelan |
| 3,783,166 A | * | 1/1974 | Peters .................. A01J 25/06 |
| | | | 426/491 |
| 3,797,980 A | | 3/1974 | Budahn |
| 3,802,332 A | | 4/1974 | Fassbender et al. |
| 3,836,688 A | * | 9/1974 | Fischer .................. A01J 25/06 |
| | | | 426/518 |
| 3,838,955 A | | 10/1974 | Dubbeld |
| 3,841,210 A | | 10/1974 | Brog |
| 3,973,042 A | | 8/1976 | Kosikowski et al. |
| 4,049,838 A | | 9/1977 | Krueger et al. |
| 4,068,014 A | | 1/1978 | Heimbruch |
| 4,268,528 A | | 5/1981 | Montigny |
| 4,318,684 A | | 3/1982 | Boucher |
| 4,418,616 A | | 12/1983 | Streeter et al. |
| 4,440,073 A | | 4/1984 | Quilliou |
| 4,472,339 A | | 9/1984 | van der Ploeg et al. |
| 4,509,413 A | | 4/1985 | Granberg et al. |
| 4,515,815 A | | 5/1985 | Kosikowski |
| 4,750,415 A | | 6/1988 | Ostemar |
| 4,817,515 A | | 4/1989 | Bjerre et al. |
| 5,052,290 A | * | 10/1991 | Nielsen .................. A01J 25/06 |
| | | | 366/261 |
| 5,082,681 A | | 1/1992 | Barlow et al. |
| 5,206,496 A | | 4/1993 | Clement et al. |
| 5,794,779 A | | 8/1998 | Weinheimer et al. |
| 5,974,779 A | | 11/1999 | Orscheln et al. |
| 6,026,737 A | | 2/2000 | D'Alterio et al. |
| 6,465,033 B2 | | 10/2002 | Menninga et al. |
| 6,912,949 B2 | | 7/2005 | Brizio |
| 7,757,876 B1 | | 7/2010 | Ditter |
| 8,322,535 B2 | | 12/2012 | Shoham et al. |
| 8,512,792 B2 | | 8/2013 | Spijkerman |
| 8,916,221 B2 | | 12/2014 | Waldburger |
| 9,049,837 B2 | | 6/2015 | Waldburger |
| 9,713,314 B2 | | 7/2017 | Waldburger |
| 9,968,070 B2 | | 5/2018 | Waldburger |
| 2007/0196537 A1 | | 8/2007 | Winkler |
| 2008/0036112 A1 | | 2/2008 | Gilg |
| 2010/0239730 A1 | | 9/2010 | Ditter |
| 2010/0263551 A1 | | 10/2010 | Pavero |
| 2014/0087014 A1 | | 3/2014 | Waldburger |
| 2014/0087045 A1 | | 3/2014 | Waldburger |
| 2015/0320007 A1 | * | 11/2015 | Hamm .................. A01J 25/02 |
| | | | 426/518 |
| 2017/0135309 A1 | | 5/2017 | Gruninger |
| 2017/0135310 A1 | | 5/2017 | Gruninger |
| 2017/0303498 A1 | | 10/2017 | Kong |
| 2019/0191659 A1 | | 6/2019 | Waldburger |

FOREIGN PATENT DOCUMENTS

| | | |
|---|---|---|
| CH | 353573 A5 | 5/1961 |
| CH | 563142 | 2/1972 |
| CH | 573142 B5 | 9/1972 |
| CH | 563142 A5 | 6/1975 |
| CH | 573142 B5 | 2/1976 |
| CH | 704208 A2 | 6/2012 |
| CH | 706999 A1 | 3/2014 |
| CH | 707000 A1 | 3/2014 |
| DE | 821572 C | 7/1949 |
| DE | 821572 C | 11/1951 |
| DE | 878577 C | 6/1953 |
| DE | 922448 C | 1/1955 |
| DE | 1030612 B | 5/1958 |
| DE | 1582967 A1 | 7/1970 |
| DE | 2823182 A1 | 12/1978 |
| DE | 2950497 A1 | 6/1981 |
| DE | 3529895 A1 | 2/1987 |
| DE | 19613068 A1 | 10/1997 |
| DE | 29812845 U1 | 10/1998 |
| DE | 29812845 U1 | 12/1998 |
| EP | 0126861 A1 | 3/1984 |
| EP | 0350777 A1 | 1/1990 |
| EP | 0406899 A1 | 1/1991 |
| EP | 0543185 A1 | 5/1993 |
| EP | 0543899 A1 | 6/1993 |
| EP | 0922448 A2 | 6/1999 |
| EP | 1269832 A1 | 1/2003 |
| EP | 1769676 A1 | 4/2007 |
| EP | 2710888 A1 | 3/2014 |
| EP | 2710889 A1 | 3/2014 |
| EP | 3167709 A1 | 5/2017 |
| FR | 2146532 A5 | 3/1973 |
| FR | 2462253 A5 | 2/1981 |
| FR | 2473840 A1 | 7/1981 |
| FR | 2527421 A1 | 12/1983 |
| FR | 2919467 A1 | 2/2009 |
| FR | 2981827 A1 | 5/2013 |
| GB | 951746 A | 3/1964 |
| GB | 1054727 A1 | 1/1967 |
| GB | 1054727 A2 | 1/1967 |
| GB | 2065487 A | 7/1981 |
| NL | 8402355 A | 2/1986 |
| WO | 1992/03297 A1 | 3/1992 |
| WO | 2004/087513 A1 | 10/2004 |
| WO | 2013/051950 A1 | 4/2013 |

OTHER PUBLICATIONS

For U.S. Appl. No. 15/344,770: (009) Office Actions dated Jan. 24, 2018; dated Jul. 24, 2018; dated Feb. 21, 2019; dated Sep. 25, 2019 Responses dated Mar. 26, 2018; dated Oct. 24, 2018; dated May 21, 2019.
For U.S. Appl. No. 15/344,909: (010) Office Actions dated Jan. 24, 2018; dated Jul. 24, 2018; dated Feb. 21, 2019; dated Sep. 25, 2019 Responses dated Mar. 26, 2018; dated Oct. 24, 2018; dated May 21, 2019.
For U.S. Appl. No. 15/344,770: (009) Response, filed Dec. 25, 2019.
For U.S. Appl. No. 15/344,909: (010) Response, filed Dec. 25, 2019.
Derwent abstract for SU876084, published Oct. 1981, 2 pages 002.
European Search Report issued for Application No. 13183880.7, dated Feb. 4, 2014, 6 pages 002.
University of Montana, Agricultural Experiment Station Circular #1, 1910; dated Jul. 22, 1939 002.
European Search Report issued for Application No. 14181770, dated Feb. 9, 2015 (wth machine translation) 004.
Google search results for "Considur fine hole trangular", retrieved Oct. 24, 20106 showing article entitled Belts With Interlaced Bards, Welded Wedge Wire Screens From Hein, www.hellotrade.com, 1 page, shown publication date Apr. 29, 2013 004.
Webpage from Hein Lehrmann website, Considur fine hole sheets, 1 page, retrieved Oct. 24, 2016, publication date prior to Jan. 1, 2013 004.
European Search Report issued for Application No. 15158045, dated Jul. 14, 2015, 3 pages 005.
European Search Report issued for Application No. 16194574, dated Feb. 14, 2017, 4 pages 009.
European Search Report issued for Application No. 16195210.6, dated Mar. 27, 2017, 3 pages 010.
European Search Report issued for Application No. 17165041, dated Sep. 7, 2017, 2 pages 011.

* cited by examiner

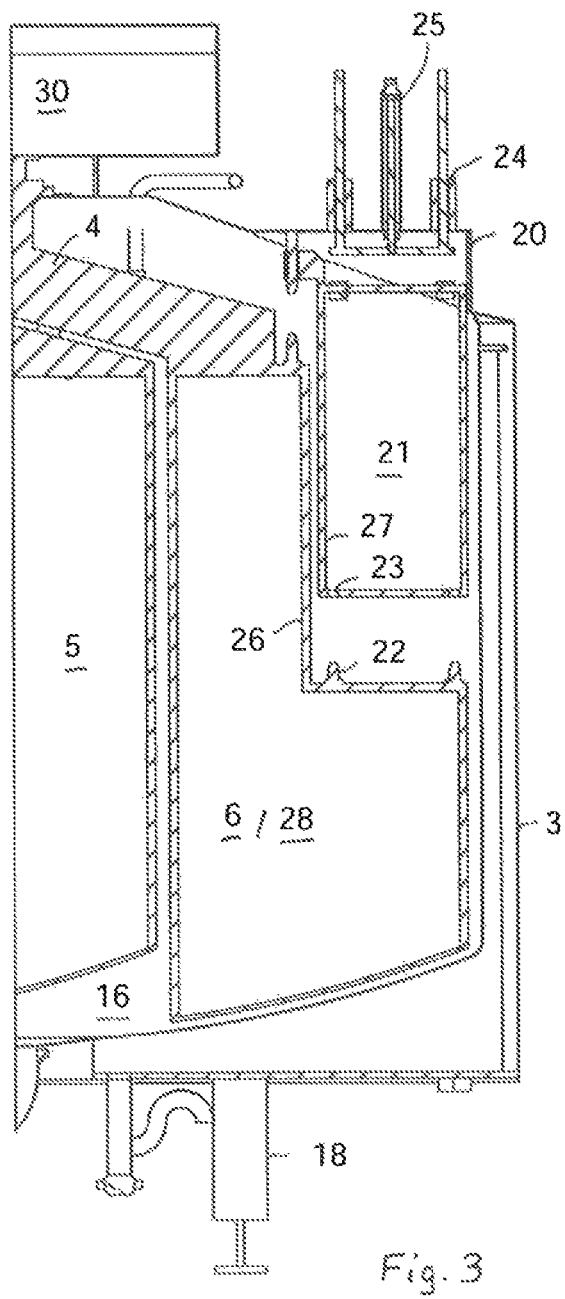
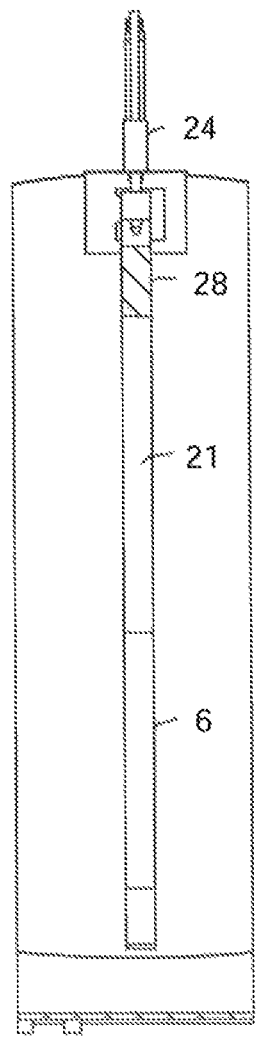
Fig. 3
Fig. 4

CHEESEMAKER

FIELD OF THE INVENTION

The invention relates to a cheesemaker with a container interior in the form of a cheese vat or cheese kettle.

BACKGROUND

In order to make cheese, milk is added to a cheese kettle, rennet is added to a cheesemaker, and the milk is continuously stirred for the cheesing process by means of agitating and cutting blades. Resultant gelatinous cheese blocks are cut by means of the agitating and cutting blades, for example see DE 29812845 U1. In the cutting process, the cheese curd is cut into grains, if possible grains of a uniform size. The cheese curd is made solid, brittle and fragile through exposure to the rennet and heat. This cheese curd is thus sensitive to mechanical loads, so that the mixing process is performed carefully. The whey must also be siphoned off carefully, so as to transfer the small pieces of cheese curd in a stable, granular state.

According to CH 563142 A, the whey is siphoned off by means of a draining device, in which the whey is siphoned off through a whey collecting chamber that is enveloped by a screen jacket and connected with a drain pipe. The screen jacket is intended to prevent cheese curd from penetrating into the whey collecting chamber.

However, the cheese curd can cause the screen surface to become clogged. In order to prevent this, the draining device can perform alternating swiveling movements in the cheese kettle (CH 573142 A), or the screen jacket or the draining device can be designed to rotate (DE 29812845 U1 or FR 2146532 A).

These two proposals share in common that the draining device for siphoning off the whey is used in the working area of the agitating and cutting blades, and the agitating and cutting blades must therefore be standing still in the siphoning process.

To avoid this disadvantage, it was also proposed that the draining device or whey collecting chamber be arranged in a recess of the cheese kettle wall, so that it cannot come into contact with the rotating agitator (DE 821572), which can have a telescoping design (DE 878577). However, devices of this kind are especially susceptible to blockage, since the screen openings can become easily clogged with pieces of cheese curd.

SUMMARY OF THE INVENTION

One embodiment of the invention relates to a cheesemaker that avoids the described disadvantages of prior art, is correspondingly easy to operate and simple in design, and also satisfies strict hygiene requirements.

Preferred embodiments of the invention are also disclosed.

A cheesemaker according to an embodiment of the invention exhibits an agitator with at least one agitating and cutting blade, which is provided with a window that can be detached or completely removed from the latter. This window is situated in such a way that agitating and cutting blade can rotate unobstructed in the cheese kettle with the whey draining device inserted.

The agitating and cutting blade according to the invention allows a good whey drainage without the agitating and cutting blade standing still while siphoning off the whey, and on the other hand can be easily and completely cleaned or is CIP-capable.

In particular, the cheesemaker according to the invention is also suitable for manufacturing high-fired (relative to temperature) cheese, i.e., hard cheese.

Preferred embodiments are also disclosed.

The agitator is preferably designed as a dual agitator with one left and one right agitating and cutting blade. The draining device is preferably arranged on the cheese kettle so that it can be swiveled or lifted.

BRIEF DESCRIPTION OF THE DRAWINGS

The invention will be described in more detail below in an exemplary embodiment. Shown in the drawing on:

FIG. 3: is an agitating and cutting blade according to the invention,

FIG. 4: is an agitating and cutting blade according to FIG. 3 as viewed from the front.

DETAILED DESCRIPTION

Figure 1:
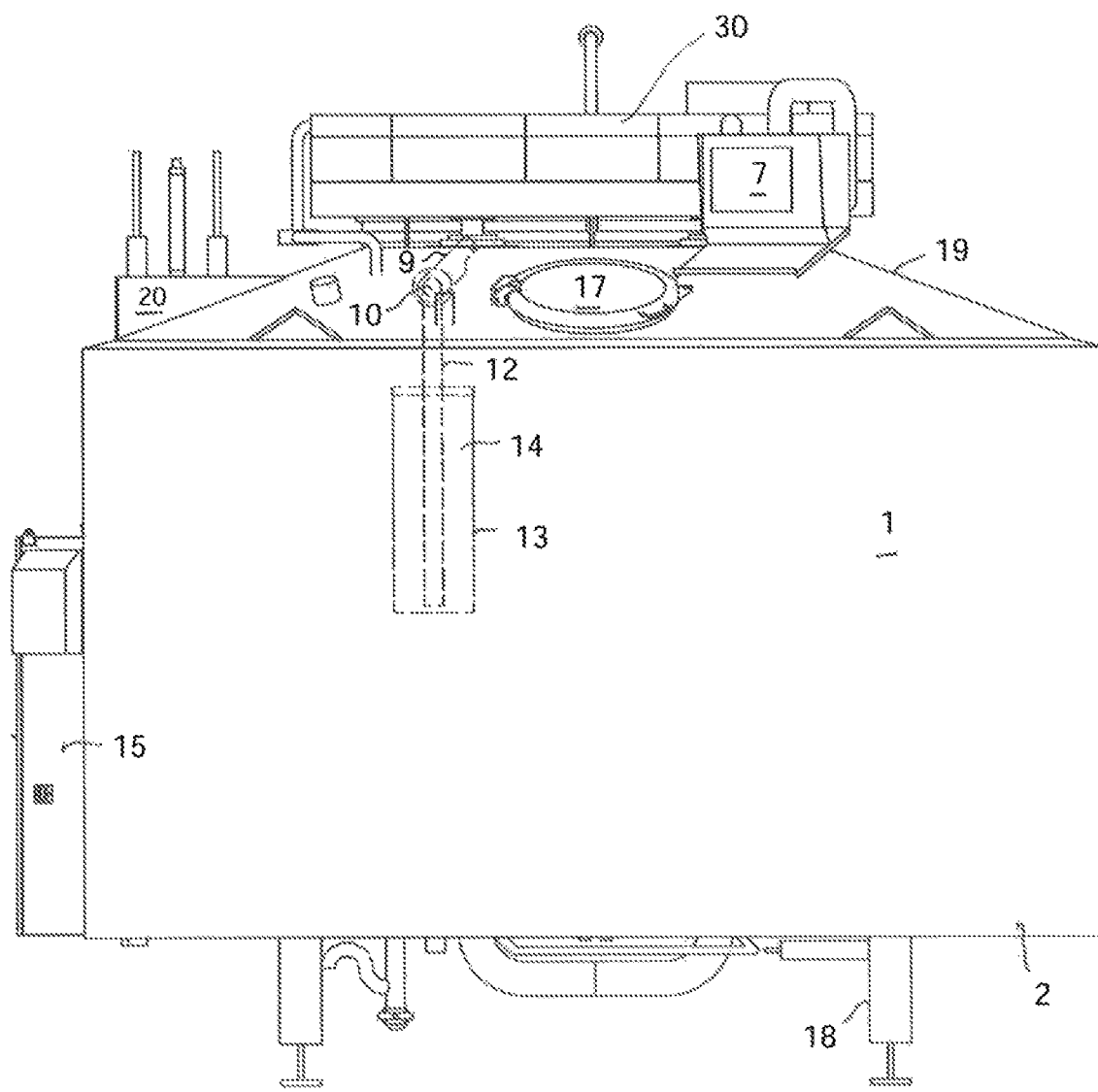
FIG. 1: is a side view of a cheesemaker according to the invention.
Figure 2:
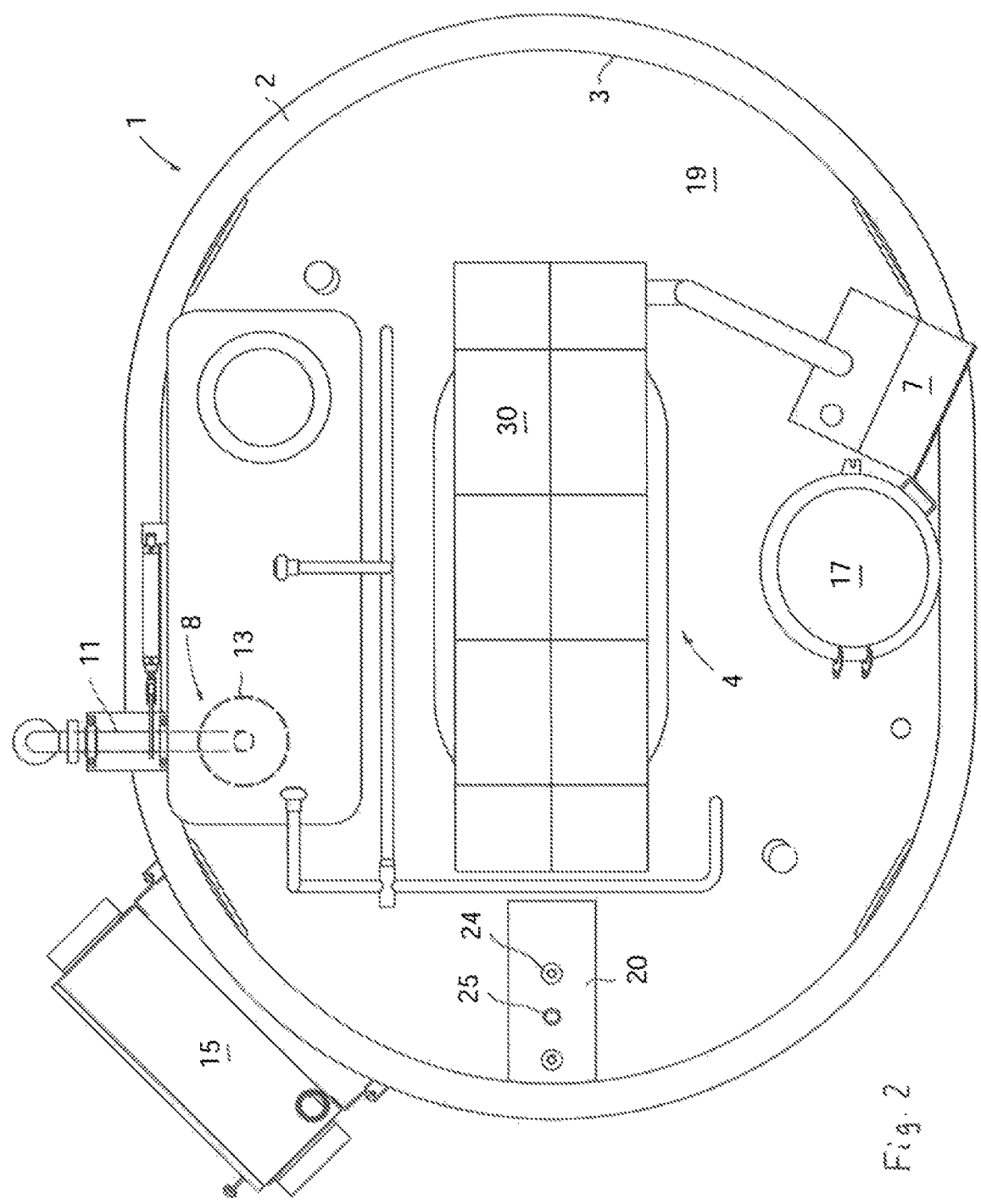
FIG. 2: is a top view of a cheesemaker according to the invention.

A cheesemaker 1 according to the invention (FIGS. 1, 2) encompasses a cheese kettle 2, which can be set up on the floor on feet 18, and whose container interior 16 is covered by a hood 19. The hood 19 is provided with a closable viewing gap 17 that exhibits a grid. The cheesemaker 1 further encompasses a controller 15 and control panel 7 with a touchscreen.

The cheese kettle 2 has a perpendicular container wall 3, which is composed of two wall parts shaped like circular arc sections as viewed from above, and bordered from below by a container floor not described in any more detail.

The cheese kettle 2 has extending into it a dual agitator 4 supported in the hood 19, whose rotational axis lies parallel to the perpendicular container wall 3. A drive 30 of the dual agitator 4 is also arranged in the hood 19. The dual agitator 4 encompasses a left and right agitating and cutting blade 5, 6 (FIG. 3), with which the milk is stirred in a known manner, and the arising gelatinous cheese blocks are cut by means of the agitating and cutting blades 5, 6, also in a known manner.

The cheesemaker 1 is further provided with a whey draining device 8, which is arranged in the hood 19 so that it can be made to swivel around an axis 10 by a swiveling cylinder 9. The whey draining device 8 exhibits a cylindrical screen jacket 13, which forms a cylindrical whey collecting chamber 14 and is joined with a drain pipe 12, which empties into a drain tube 11. In a resting position, the whey draining device 8 is located outside of the filled milk, roughly parallel to the plane of the hood 19. The screen jacket 14 can potentially also be configured as a rotatable screen basket in conjunction with the whey collecting chamber 14.

In order to siphon off whey, the screen jacket 13 is swiveled by the swiveling cylinder 9 by about 90° into the mixture of cheese curd and whey. The whey remaining after the siphoning process is siphoned out of the cheese kettle 2 with the cheese curd in the usual manner by means of a ground drain (not shown in any more detail), and relayed to cheese molds of a cheese press.

The respectively driven agitating and cutting blades 5, 6 each run opposite each other in the container interior 16 around vertical rotational axes each situated in the circle center of the wall parts shaped like circular arc sections, and thereby pass through working circles that overlap each other. The agitating and cutting blades 5, 6 here rotate in such a way that the tools for agitating and cutting cover all areas of the container 16 filled by the mixture of cheese curd and whey.

The one agitating and cutting blade 6 on the right hand side in the exemplary embodiment is made up of two parts, and consists of a fixedly arranged blade 28 and a shape enhancing window 21 (blade element) that can be detached from the latter, see FIG. 3. The window 21 is joined with the blade 28 by means of a guide (not shown in any more detail) and a positioning device. The positioning device is held in a frame 26 of the blade 28 by positioning pins 22 and in a frame 27 of the window 21 by correspondingly formed positioning boreholes 23, wherein the positioning pins 22 and positioning boreholes 23 can also be arranged in reverse. In addition, the window 21 is joined with a lifting guide 24, which is arranged on or in a console 20 of the hood 19. The lifting guide 24 is joined with a lifting cylinder 25, so that the window 21 can be moved relative to the blade 28.

As soon as whey is to be siphoned out of the container interior 16 of the cheese kettle 2, the screen jacket 13 with the whey collecting chamber 14 is swiveled into the whey by means of the swiveling cylinder 9 on the one hand, while on the other hand the window 21 is lifted from the blade 28 by means of the lifting cylinder 25 to a point where the rotational movement of the agitating and cutting blade 5, 6 can be continued without colliding with the whey draining device 8 or without disrupting the siphoning of whey.

If necessary, the lifting movement of the window 21 can also be combined with a swiveling movement of the latter, or alternatively take place only as a swiveling movement.

REFERENCE LIST

1 Cheesemaker
2 Cheese kettle
3 Container wall
4 Dual agitator
5 Left agitating and cutting blade
6 Right agitating and cutting blade
7 Control panel
8 Whey draining device
9 Swiveling cylinder
10 Axis
11 Drain tube
12 Drain pipe
13 Screen jacket
14 Whey collecting chamber
15 Controller
16 Container interior
17 Viewing gap
18 Foot
19 Hood
20 Console
21 Window
22 Positioning pin
23 Positioning borehole
24 Lifting guide
25 Lifting cylinder
26 Frame
27 Frame
28 Blade
30 Drive

What is claimed is:

1. A cheesemaker provided with a container interior in the form of a cheese vat or cheese kettle, which incorporates an agitator with at least one rotatably driven agitating and cutting blade,
wherein the agitating and cutting blade is provided with a releasable or detachable blade element that can be detached from the agitating and cutting blade, and can be moved relative to the agitating and cutting blade, and
the releasable or detachable blade element is arranged so that the releasable or detachable blade element can be lifted and/or swiveled, and suspended on a hood of the cheesemaker.

2. The cheesemaker according to claim 1,
wherein the agitator is designed as a dual agitator with one left agitating and cutting blade and one right agitating and cutting blade, and
the releasable or detachable blade element is allocated to the right agitating and cutting blade.

3. The cheesemaker according to claim 1, wherein the releasable or detachable blade element is joinable with the blade of the agitating and cutting blade by guide means and positioning means.

4. The cheesemaker according to claim 1, wherein relative movement of the releasable or detachable blade element can be coupled with the handling of a whey draining device.

5. The cheesemaker according to claim 4, wherein the agitating and cutting blade is designed so as not to collide with the whey draining device in the container interior.

* * * * *